Figures 1, 2:
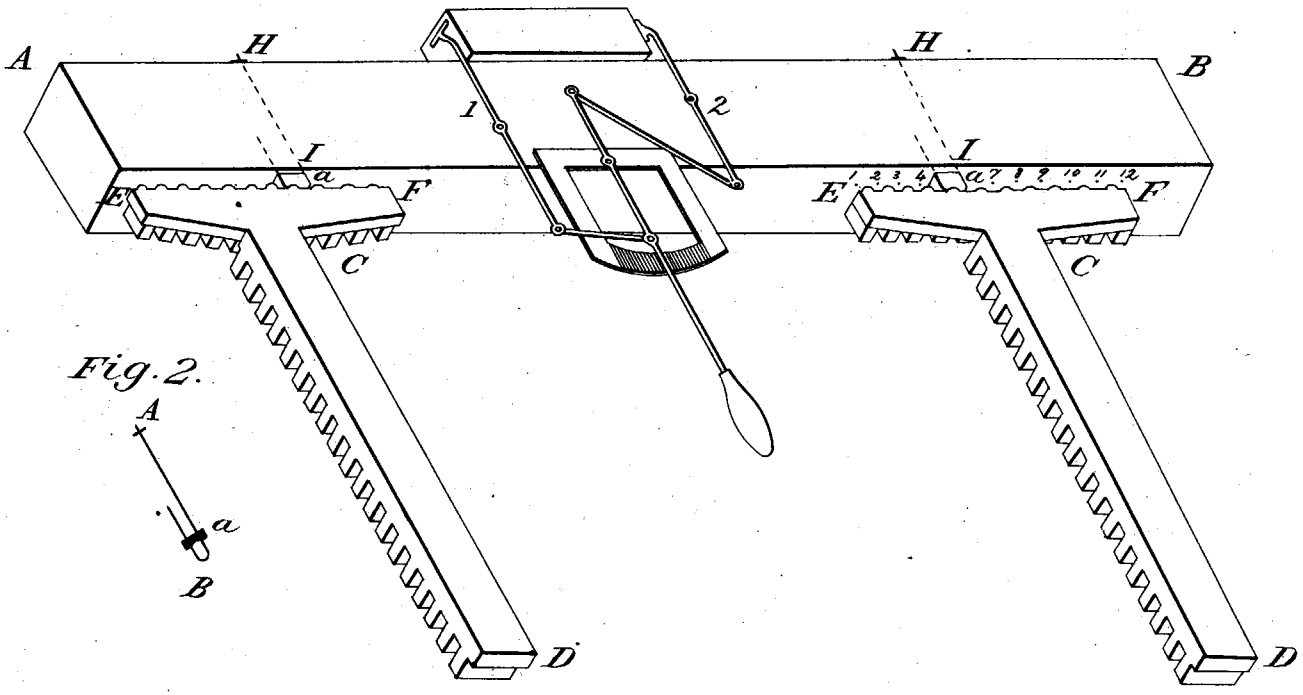

*Elkanah Leonard.*
*Shingle Machine.*

*№ 5.* *Reissued Oct 26. 1838.*

N. PETERS, PHOTO-LITHOGRAPHER, WASHINGTON, D. C.

UNITED STATES PATENT OFFICE.

ELKANAH LEONARD, OF CANTON, MAINE.

IMPROVEMENT IN THE MODE OF CONSTRUCTING THE GAGES OF MACHINES FOR SAWING SHINGLES.

Specification forming part of Letters Patent No. 453, dated November 4, 1837; Reissue No. 5, dated October 26, 1838.

*To all whom it may concern:*

Be it known that I, ELKANAH LEONARD, of Canton, in the county of Oxford and State of Maine, have invented a new and useful Improvement in the Shingle-Machine, especially those of Andrews, and of Moreton, for Sawing Shingles, but which may be applied to any such machine that sets alternately at either end by means of gages or racks to regulate the thickness of the shingle, which improvement I verily believe has not been known or used prior to the invention thereof by me; and I do hereby declare that the following is a full and exact description of the same.

The nature of my invention consists in so altering the gages that they may be attached to the saddle or sliding block at any distance apart that may be wished, and thus the pivots on which the saddle or slide-block turns may be varied, so as to fit the set to almost any length of shingle. The gages, like those now in use, are two in number, and made of cast-iron. The difference between the original and improved gage consists in casting an additional piece on the end of the gage next to the slide-block at right angles with the main part or original gage, and of a length suited to the different lengths of shingles which the machine is intended to saw. This additional piece may be made to run out on one or both sides of the old gage, the operation being the same. It may be made with a slide in it, by which to attach it to the slide-block; but perhaps a better way may be to cast it full of pivots, as nigh together as would leave room for a staple to run round them and through the sliding block. There are holes made through the slide-block against each of the pivots. All that is necessary to shift it from one length of shingle to another is to take the staple out of the hole in the slide-block and put it around another pivot and through that pivot's appropriate hole. It is held in its place by a nut on the opposite side of the slide-block. A small piece of iron is secured between the pivot and the slide-block, of sufficient thickness to keep the remaining pivots from striking.

The machine is worked in the same manner as those now in use, and the design of this improvement is to effect the sawing of shingles of any length desired, whereas nearly all shingle-machines known to the subscriber are confined to the formation of one length of shingles. It is this only that he claims as his invention, and for which he claims a patent.

ELKANAH LEONARD.

Witnesses:

SAM. H. BROWN,

JACOB LEONARD.